Sept. 22, 1925.  W. J. MEINEL  1,554,746
ADJUSTABLE TORCH HOLDER
Filed July 31, 1920
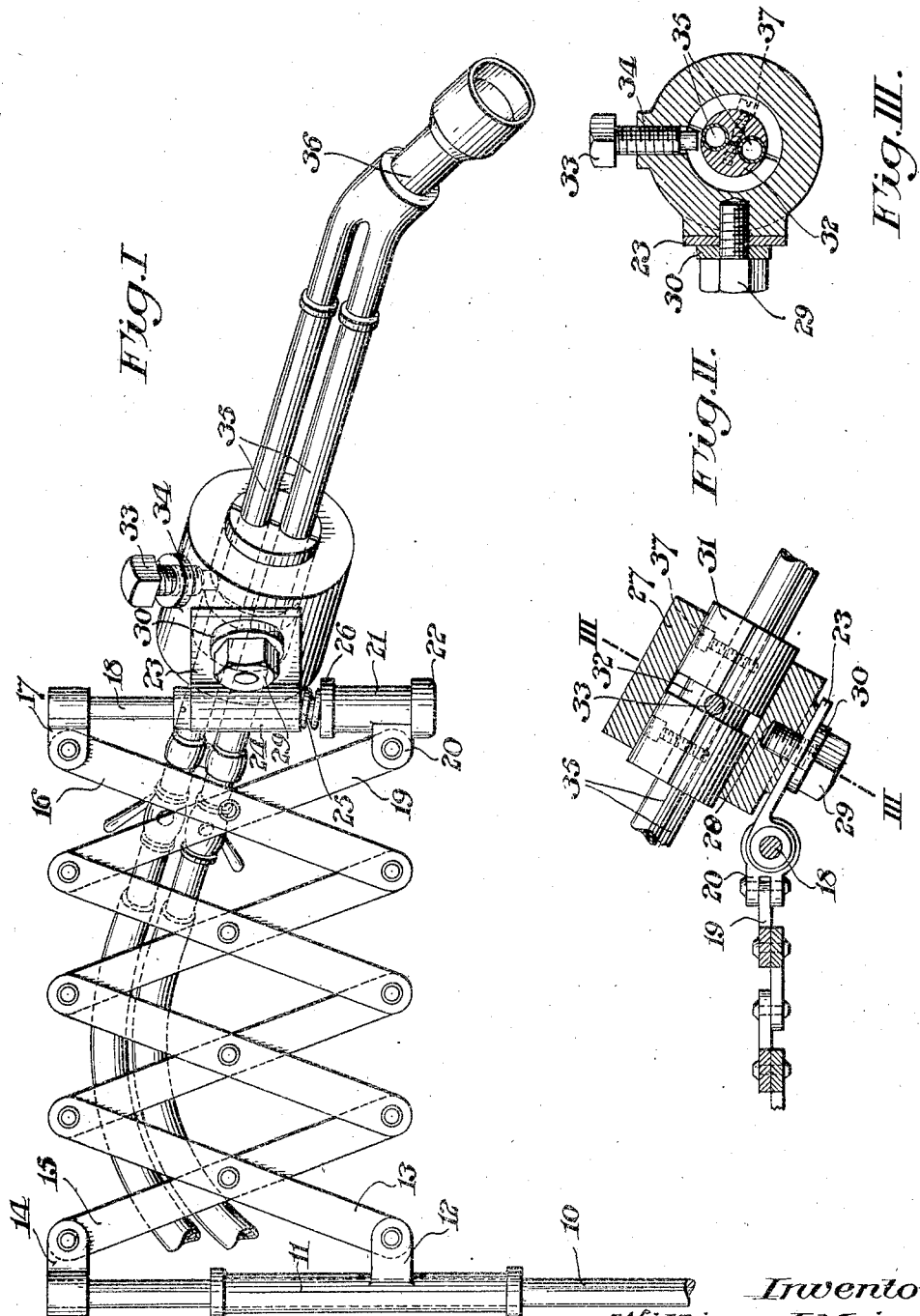
Witness:
P. H. Schleicher
Inventor.
William J. Meinel
By C. B. Desjardins
Attorney.

Patented Sept. 22, 1925.

1,554,746

UNITED STATES PATENT OFFICE.

WILLIAM J. MEINEL, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ADJUSTABLE TORCH HOLDER.

Application filed July 31, 1920. Serial No. 400,383.

*To all whom it may concern:*

Be it known that I, WILLIAM J. MEINEL, residing at Philadelphia, county of Philadelphia, State of Pennsylvania, have invented certain new and useful Improvements in Adjustable Torch Holders, of which I declare the following to be a full, clear, and exact description.

My invention relates to improvements in adjustable torch holders. My invention relates particularly to improved devices and means for holding torches, such as are used for welding, in any desired position, so that the flame of the torch may be directed against parts which would otherwise be inaccessible.

In the manufacture of automobile bodies, it has been found that large stampings, such as the tonneau panels, sometimes wrinkle in the press and, in order to avoid scrap in such stampings, it has been the practice to put them on a hammer block, heat the wrinkled parts, and, when the metal has been heated, hammer out the wrinkles on the block. To accomplish this, so far it has been necessary to provide two men, one man to wield the hammer and another man to hold the torch and direct it upon the places to be heated. This has been necessary because each stamping, as a rule, has needed to be heated at different places, and these places were inaccessible, so that it required the entire attention of one man to handle the torch.

My invention provides a torch holder which is universally adjustable so that it may be adjusted to direct a flame upon the work from practically any angle. This holder is such that it may be adjusted to direct the flame upon the work, and will remain in its adjusted position without attention. This dispenses with the need for a helper to hold the torch, in connection with the work described above.

One of the chief objects of my invention is to provide means for holding a torch, which are of such a nature that the torch can be adjusted to direct the flame on the work from practically any angle, and which may be used within a comparatively large range. Another object of my invention is to provide a universally adjustable support or holder for such a torch, which will permit the adjustment of the torch to any desired position and hold it in such position, leaving operator free for other duties.

Further objects, and objects relating to economies of production and details of construction, will definitely appear from the detailed description to follow. My invention is clearly defined and pointed out in the appended claims. A structure, constituting a preferred embodiment of my invention is illustrated in the accompanying drawings forming a part of this specification, in which:

Fig. I is a view inside elevation of an embodiment of my invention.

Fig. II is a transverse, sectional view through the torch holder, and

Fig. III is a sectional view on the line III—III of Fig. II.

In the drawing, similar reference numerals refer to similar parts throughout the several views. Considering the numbered parts of the drawing, I have shown an adjustable torch holder, comprising a fixed support or standard, 10, having a sleeve, 11, slidably mounted thereon and provided with a lateral ear, 12. This ear, 12, is pivotally connected to the rear end of a link, 13, of a lazy-tongs linkage. At the upper end of the standard, 10, there is fixed a part having a laterally projecting ear, 14, to which the rear end of the link, 15, of the lazy-tongs linkage, is pivotally connected. The links, 13 and 15, are pivotally connected together, and to the other links, in the usual manner of such a linkage and, at the other end of the linkage, there are pivotally connected links, 16 and 19. The relatively movable standard, 18, has a part fixed to its upper end having a laterally projecting ear, 17, to which the free end of link, 16, is pivoted. A sleeve, 21, is slidably mounted on the standard, 18, and carries a laterally projecting ear, 20, to which the free end of the link, 19, is pivoted. At the lower end of the standard, 18, there is provided a stop-shoulder, 22, limiting the movement of the sleeve, 21, in one direction. Sleeve, 24, is rotatably mounted upon the standard, 18, and between the upper end of the sleeve, 21, and the lower end of the sleeve, 24, there is mounted a cushioning spring, 25. A flange, 23, projects laterally from the sleeve, 24. A ring, 27, is provided with a radially extending socket, 28, in which is mounted a bolt, 29, extending through an opening in the flange, 23, and screwed into said socket. A washer, 30, is interposed between the head of the bolt, 29, and the flange, 23. This provides a mounting of the ring, 27, around a horizontal axis and it will be observed that by tightening the bolt, the ring may be clamped in any one of its adjusted positions around such axis.

Within the ring, 27, there is mounted a block, 31, having a central annular groove, 32. A set screw, 33, is mounted in a boss, 34, in the side of the ring, 27, and the end of the set screw projects into the groove, 32, so that the ring is rotatable within the ring, 27, but is held against axial movement relative thereto. The block, 31, is made of two halves, each provided with a pair of longitudinal grooves, so that, when the two halves of the block are clamped together by the bolts, 37, the block, 31, embraces the pipes, 35, of the torch, 36, which pipes lie in the longitudinal passages formed by the mating grooves. As a result, the block becomes practically an integral part of the torch and is firmly fastened thereto, but at the same time is easily accessible and may be easily removed.

It will be observed that this arrangement provides a universally adjustable torch-holder. Sleeve, 24, is rotatable around a vertical axis within a compartively large range and the ring, 27, is rotatable around a horizontal axis, while the block within the ring is rotatable around an axis extending at right angles to both of the other axes, so as to give practically universal adjustment and permitting the flame to be directed at practically any angle. In addition to this, the lazy-tongs linkage permits of the use of this torch at varying distances from its fixed point of support.

We have found that the use of this adjustable torch-holder is very desirable, because, for one reason, with it one man can do the work formerly done by two. For instance, it is no longer necessary to employ a helper in connection with the work referred to in the first part of this specification. The holder is of such a nature that it can be adjusted to direct the flame on the work at any point or any angle required, after which the operator may proceed to pound out the wrinkles without paying any attention to the holder. It is to be understood that this torch-holder is not limited to use in connection with the work which we have described. This is merely one of the situations in which my improved torch-holder has been found to be very desirable. It will find application and wide use in many other connections.

I am aware that the particular embodiment of my invention, here shown and described, may be varied considerably, without departing from the spirit of my invention, and, therefore, I desire to claim broadly my invention as well as specifically, as indicated by the appended claims.

Having thus described my invention, what I claim as new and desire to secure by Letters Patent, is:—

1. An adjustable torch-holder, comprising the combination of a fixed support, a standard extensibly supported thereby, a sleeve rotatably mounted on said standard and provided with a laterally extending flange, and a block carried by said flange and mounted for axial rotation thereon, and a torch extending longitudinally through said block and supported thereby.

2. An adjustable torch-holder, comprising the combination of a support, a ring adjustably mounted thereon, a block rotatably mounted within said ring and adapted to carry a torch, said block being provided with an annular groove, and a set screw carried by said ring with its end disposed in said groove.

3. An adjustable torch-holder, comprising the combination of a support, a ring adjustably mounted on said support, and a block adapted to carry a torch and rotatably mounted in said ring, said block including halves clamped about said torch, and means for holding said block from axial movement relative to said ring.

4. An adjustable torch-holder, comprising the combination of a support, a bracket carried by said support and rotatable around a vertical axis, a ring carried by said bracket and rotatable around a horizontal axis, and a block adapted to carry a torch and mounted in said ring and rotatable around an axis perpendicular to that on which the ring is mounted.

5. An adjustable torch-holder, comprising the combination of a support, a bracket rotatably mounted thereon, a ring having a laterally projecting pin pivotally mounted in said bracket, and a block adapted to carry a torch and rotatably mounted within said ring.

6. An adjustable torch-holder, comprising the combination of a support, a ring adjustably mounted thereon, a block rotatably mounted in said ring and comprising a pair of halves clamped together and having a pair of parallel grooves in their mating surfaces, in which the feed-pipes of the torch are adapted to lie, and means preventing axial movement of said block relative to said ring.

7. An adjustable torch-holder, comprising the combination of a ring, a pair of semicylindrical blocks, each having a pair of longitudinal grooves in its plane surface, and a transverse groove in its curved surface, means clamping said blocks together with said grooves in alinement, the feed-pipes of a torch being adapted to lie in said longitudinal grooves, and means carried by said ring and projecting into said transverse groove to limit axial movement of said blocks.

8. An adjustable torch holder, comprising the combination of a block adapted to be clamped about a torch, a ring in which said block is rotatably mounted, and means limiting axial movement of said block relative to said ring.

9. An adjustable torch holder comprising a support, a vertical rod, an extensible connection between said support and said rod, a sleeve rotatably mounted on said rod, a ring carried by said sleeve and adjustable around an axis perpendicular to that of the ring, and a torch-carrying block rotatably mounted in said ring.

In testimony whereof, I affix my signature.

WILLIAM J. MEINEL.